US012753588B2

(12) United States Patent
Freeman

(10) Patent No.: US 12,753,588 B2
(45) Date of Patent: Oct. 6, 2026

(54) FAUCET WATER TEMPERATURE GUIDE DEVICE

(71) Applicant: Donald Freeman, Hanford, CA (US)

(72) Inventor: Donald Freeman, Hanford, CA (US)

( * ) Notice: Subject to any disclaimer, the term of this patent is extended or adjusted under 35 U.S.C. 154(b) by 322 days.

(21) Appl. No.: 18/422,268

(22) Filed: Jan. 25, 2024

(65) Prior Publication Data

US 2024/0410141 A1 Dec. 12, 2024

Related U.S. Application Data

(60) Provisional application No. 63/506,935, filed on Jun. 8, 2023.

(51) Int. Cl.
*E03C 1/04* (2006.01)
*F16K 37/00* (2006.01)
(Continued)

(52) U.S. Cl.
CPC .............. *E03C 1/04* (2013.01); *E03C 1/0408* (2013.01); *F16K 37/0016* (2013.01);
(Continued)

(58) Field of Classification Search
CPC ......... G09F 2003/023; G09F 2007/127; G09F 3/04; G09F 3/10; G12B 9/10;
(Continued)

(56) References Cited

U.S. PATENT DOCUMENTS 3,356,105 A * 12/1967 Marr .................. F16K 37/0016 137/556.3
7,124,452 B1 10/2006 Bauza
(Continued)

FOREIGN PATENT DOCUMENTS

DE 202015007450 U1 * 11/2015 ............... G07C 1/30
GB 2110864 A * 6/1983 ............ G08B 7/066

OTHER PUBLICATIONS

Computer translation of DE_202015007450_U1 (Year: 2026).*

*Primary Examiner* — Randy W Gibson
(74) *Attorney, Agent, or Firm* — Brennan, Manna & Diamond, LLC

(57) ABSTRACT

A faucet water temperature indicator device is disclosed. In one embodiment, the device is constructed from waterproof, lightweight plastic and adheres securely to a faucet fixture and/or handle, or a surface surrounding the faucet handle. The device features a semi-circular shape with a front surface displaying faucet handle position markers. Users correlate the faucet handle's position with the markers to achieve the desired water temperature consistently, eliminating the need for trial and error. In another embodiment, the front surface is color-coded to differentiate hot and cold water positions. An arrow indicator attached to the faucet handle guides users to the appropriate marker, thereby streamlining temperature adjustment. In yet another embodiment, a circular wall-mounted version of the device accommodates bathtub/shower/sink fixtures and handles. The circular version features a central cavity, adhesive rear surface, and symmetrically positioned markers on differently colored portions of the front surface.

8 Claims, 5 Drawing Sheets

(51) Int. Cl.

| | |
|---|---|
| ***G01K 1/143*** | (2021.01) |
| ***G12B 11/02*** | (2006.01) |
| *G09F 3/02* | (2006.01) |
| *G09F 3/04* | (2006.01) |

(52) U.S. Cl.
CPC .............. *G01K 1/143* (2013.01); *G12B 11/02* (2013.01); *E03C 2001/0418* (2013.01); *G09F 2003/023* (2013.01); *G09F 3/04* (2013.01)

(58) Field of Classification Search
CPC ... G12B 11/02; E05C 1/0408; F16K 37/0016; F16K 37/0058; Y10T 137/8292; Y10T 137/8309; E03C 1/04; E03C 2001/0418; G01K 13/02; G01K 11/12; G01K 1/143
See application file for complete search history.

(56) References Cited

U.S. PATENT DOCUMENTS

| | | | | |
|---|---|---|---|---|
| 9,273,451 | B2 | 3/2016 | Brunoli | |
| 10,489,038 | B2 | 11/2019 | Klicpera | |
| 2006/0243330 | A1* | 11/2006 | Abanto ................. | E03C 1/0408 137/556.3 |
| 2016/0378322 | A1 | 12/2016 | Klicpera | |
| 2018/0298596 | A1 | 10/2018 | Tsai | |

* cited by examiner

FAUCET WATER TEMPERATURE GUIDE DEVICE

CROSS-REFERENCE TO RELATED APPLICATION

The present application claims priority to, and the benefit of, U.S. Provisional Application No. 63/506,935, which was filed on Jun. 8, 2023 and is incorporated herein by reference in its entirety.

FIELD OF THE INVENTION

The present invention generally relates to the field of bathing and showering accessories and fixtures. More specifically, the present invention relates to a novel faucet temperature indicator device that can be placed around, or along, a water faucet to enable users to find their ideal or preferred water temperature instantly each time. The device comes in different shapes to fit around faucet handles/fixtures and includes markers thereon for being used as position reference for faucet handle. A user correlates the position of the faucet handle with one of the markers when achieving the desired water temperature and in subsequent usages, the faucet handle is positioned at the same marker to obtain faucet water at the desired temperature without trial and error of turning the faucet handle. Accordingly, the present disclosure makes specific reference thereto. Nonetheless, it is to be appreciated that aspects of the present invention are also equally applicable to other like applications, devices, and methods of manufacture.

BACKGROUND

By way of background, individuals like to bathe/shower in water that has an ideal or preferred temperature. However, finding the ideal or preferred water temperature every time for bathing/showering is a cumbersome and time-consuming task. Typically, during a bath/shower, for finding the perfect or preferred (i.e., desired) water temperature, an individual adjusts the faucet back and forth, waiting for the water to reach the desired temperature. The same activity is done multiple times during a single bath/shower by the individual. The constant adjustment of the faucet to reach the right temperature results in the wastage of water. As individuals adjust the faucet to wait for the water to reach the ideal or preferred temperature, gallons of water flow down the drain, contributing to water wastage. Many individuals use bath/shower thermometers to avoid the discomfort of getting into water that is too hot or too cold. However, these devices require extra time and effort to use, as they involve testing the water temperature before entering the tub or shower. This is not only expensive to buy such thermometers but consumes time and does not prevent water wastage.

Inconsistently adjusted water temperature can pose safety risks, particularly for small children and the elderly. Too hot water can scald while too cold water can also lead to health issues. Also, children often require help from adults to adjust the water temperature which can be impractical, especially during busy mornings or when parents are not available. Individuals desire a device that provides indications to users to turn the faucet to release water at the desired temperature easily and instantly without wasting water.

Therefore, there exists a long felt need in the art for a ring device that adheres around a faucet handle or fixture for providing a simple and effective means of setting and maintaining the desired water temperature. Additionally, there is a long felt need in the art for a shower dial device that helps users easily find their desired water temperature when using a water faucet or shower. Moreover, there is a long felt need in the art for a water temperature indicator device that provides a visual and tactile reference point for setting the water temperature. Further, there is a long felt need in the art for a water temperature indicator device that helps individuals remember the position of the faucet handle for releasing water at the desired temperature from a faucet or shower. Furthermore, there is a long felt need in the art for a water faucet accessory device that enables users to turn their faucet handle to the same location to get desired water temperature without trial and error. Finally, there is a long felt need in the art for a water temperature indicating device that improves the overall bathing/showering experience, helps to save water, and ensures the safety and comfort of all users, including children.

The subject matter disclosed and claimed herein, in one embodiment thereof, comprises a faucet water temperature indicator device. The device, in one embodiment, is made of a waterproof and lightweight plastic body designed to adhere around a faucet or shower handle. The plastic body has a semi-circular shape with a front surface and a rear adhesive surface. The rear adhesive surface securely adheres around a circular faucet, fixture, or shower handle. The front surface includes a plurality of faucet handle position markers, the markers indicate specific locations of the faucet handle for achieving desired water temperatures. In use, a user correlates the position of the faucet handle with one of the markers on the front surface when achieving the desired water temperature and in subsequent usages, the faucet handle is positioned at the same marker to obtain faucet water at the desired temperature without trial and error of turning the faucet handle. In some embodiments, the device comes in a circular or semi-circular shape to secure around a circular wall base of the faucet handle or fixture.

In this manner, the faucet water temperature indicator device of the present invention accomplishes all of the forgoing objectives and provides users with a plastic, rigid, semi-rigid, or flexible device that adheres around a faucet handle for providing a simple and effective means of setting and maintaining the desired water temperature. The device helps users easily find their desired water temperature when using a water faucet or shower and provides a visual reference point for setting the water temperature. The device helps individuals remember the position of the faucet handle for releasing water at the desired or preferred temperature from a faucet or shower and improves the overall bathing/showering experience, helps to save water, and ensures the safety and comfort of all users, including children.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a faucet water temperature indicator device. The device is made of a waterproof and lightweight rigid, semi-rigid, or flexible body designed to adhere around a faucet handle. The body includes a semi-circular shape with a front surface and a rear adhesive surface. The rear adhesive surface is waterproof and scratch-proof, configured to securely adhere around a circular faucet, fixture, or shower handle. The front surface includes a plurality of faucet handle position markers, the markers indicate specific locations of the faucet handle for achieving desired water temperatures. In use, a user correlates the position of the faucet handle with one of the markers on the front surface when achieving the desired water temperature and for achieving preferred water temperature in subsequent usages, the faucet handle is positioned at the same marker (i.e., position) to achieve faucet water at the desired temperature without trial and error of turning the faucet handle.

In yet another embodiment, a waterproof and lightweight body device designed to adhere around a faucet handle to indicate faucet handle position is disclosed. The device includes a semi-circular body, the body has a front surface and a rear adhesive surface, the front surface includes a plurality of consecutive numbered faucet handle position markers, the markers are used for indicating specific locations of the faucet handle for achieving desired water temperature. The front surface has a first portion coded in a first color and has a second portion coded in a second color, the first color indicates the position of the faucet handle in dispensing of hot water and the second color indicating the dispensing of cold water. An arrow sticker with pointed end towards the front portion of the device is attached to the faucet handle. In use, a user correlates the position of the faucet handle with one of the markers (i.e., positions) on the front surface using the arrow sticker wherein the arrow sticker points to the one of the markers when achieving the desired water temperature in the present usage and in subsequent usages, the faucet handle is positioned at the same marker or position to obtain faucet water at the desired temperature without trial and error of turning the faucet handle.

In a further embodiment, a circular or semi-circular wall mounted device designed for placement around a bathtub faucet and shower handle for indicating position of the handle is disclosed. The device comprising a front surface, an adhesive rear surface, a central cavity within the device adapted to accommodate a handle, a plurality of faucet handle markers on the front surface configured to indicate the position of the faucet handle, and the front surface is divided into a first portion of a first color and a second equal and opposing portion of a second color, with the faucet handle markers are symmetrically positioned in both the first and second portions.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
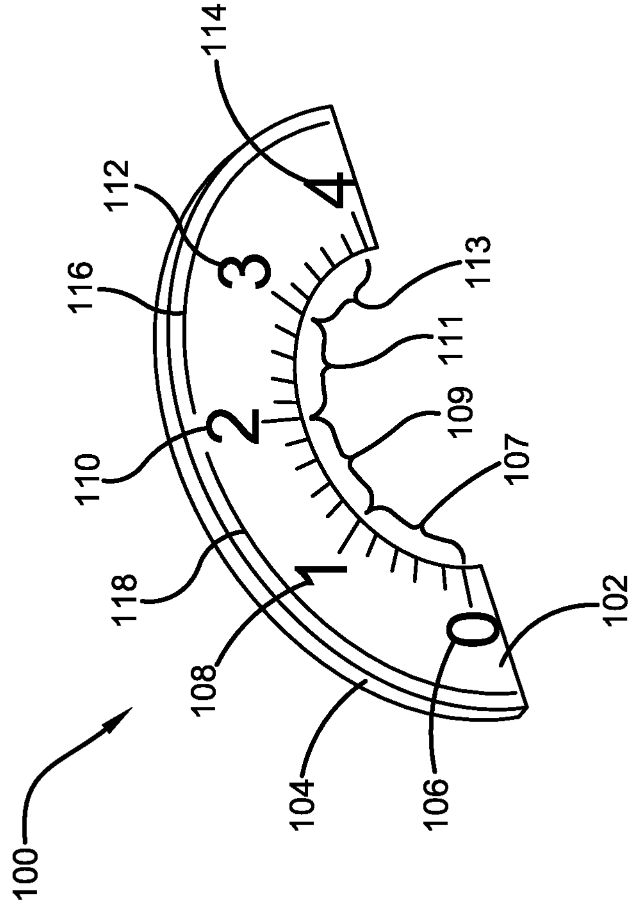
FIG. 1 illustrates a perspective view of a faucet water temperature indicator device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a semi-rigid or flexible (i.e., plastic) ring device that adheres around a faucet handle for providing a simple and effective means of setting and maintaining the desired water temperature. Additionally, there is a long felt need in the art for a shower dial device that helps users easily find their desired water temperature when using a water faucet or shower. Moreover, there is a long felt need in the art for a water temperature indicator device that provides a visual and tactile reference point for setting the water temperature. Further, there is a long felt need in the art for a water temperature indicator device that helps individuals remember the position of the faucet handle for releasing water at the desired or preferred temperature from a faucet or shower. Furthermore, there is a long felt need in the art for a water faucet accessory device that enables users to turn their faucet handle to the same location or position to obtain the desired water temperature without trial and error. Finally, there is a long felt need in the art for a water temperature indicating device that improves the overall bath/showering experience, helps to save water, and ensures the safety and comfort of all users, including children.

The present invention, in one exemplary embodiment, is a circular or semi-circular mounted device designed for placement around a bathtub faucet and/or shower handle for indicating the water temperature position of the handle. The device comprising a front surface, an adhesive rear surface, a central cavity within the device adapted to accommodate a handle or fixture, a plurality of faucet handle markers on the front surface configured to indicate the position of the faucet handle, and the front surface is divided into a first portion of a first color and a second opposing portion of a second color, wherein the faucet handle markers are symmetrically positioned in both the first and second portions.

Referring initially to the drawings, FIG. 1 illustrates a perspective view of a faucet water temperature indicator device of the present invention in accordance with the disclosed structure. The faucet water temperature indicator device 100 is designed in the form of a waterproof and lightweight plastic device that adheres around a faucet handle. The shower dial device 100, in the present embodiment, is of a semi-circular shape and has a front surface 102 and a rear adhesive surface 104. The device 100 is shaped in the semi-circular shape enabling the device 100 to be easily secured around circular faucet/fixture or shower handles using the rear adhesive surface 104. The adhesive surface 104 is waterproof and scratch-proof.

The front surface 102 has a plurality of sequential faucet handle position markers (shown as numbers 0-4 through numerals 106, 108, 110, 112, 114, respectively). Further, the front surface 102 is color coded in different colors with a first color coded portion 116 and a second color coded portion 118 color coded in a second color. The first color can be red color for indicating movement of the faucet handle to dispense hot water and the second color can be blue color for indicating dispensing of cold water. The portions 116, 118 are consecutive, substantially equal, symmetrical, and wherein each portion is about half of the complete front surface 102. The sequential markers or visual indicators 106-114 function as temperature and location indicators for a faucet handle around which the device 100 is placed. The color coding helps a user to remember the temperature (whether hot or cold) of the water and a number indicates the exact location of the faucet handle for dispensing the water at the desired or preferred temperature. Depending on the duration of visibility and availability of external light sources, the markers or indicators 106-114 can be phosphorescent or fluorescent for luminated viewing during low light conditions. Additionally, the indicators 106-114 comprise raised relief indicators for tactile identification and placement of the faucet handle along the front surface 102 during low light or no light situations, or when an individual's eyes are unable to view the faucet handle and the shower dial device 100. As shown in the FIGS., the indicators 106-114 include additional sub-dividers 107, 109, 111, 113 between the indicators 106-114 providing more detail of faucet handle placement.

During initial use, when the desired water temperature is achieved by a user, the position of the faucet handle is correlated with the device 100 and in subsequent usages, the handle can then be rapidly moved and positioned at the same position (same number and sub-divider) for getting faucet water at the desired or preferred temperature without wasting any water and time.

Figure 2:
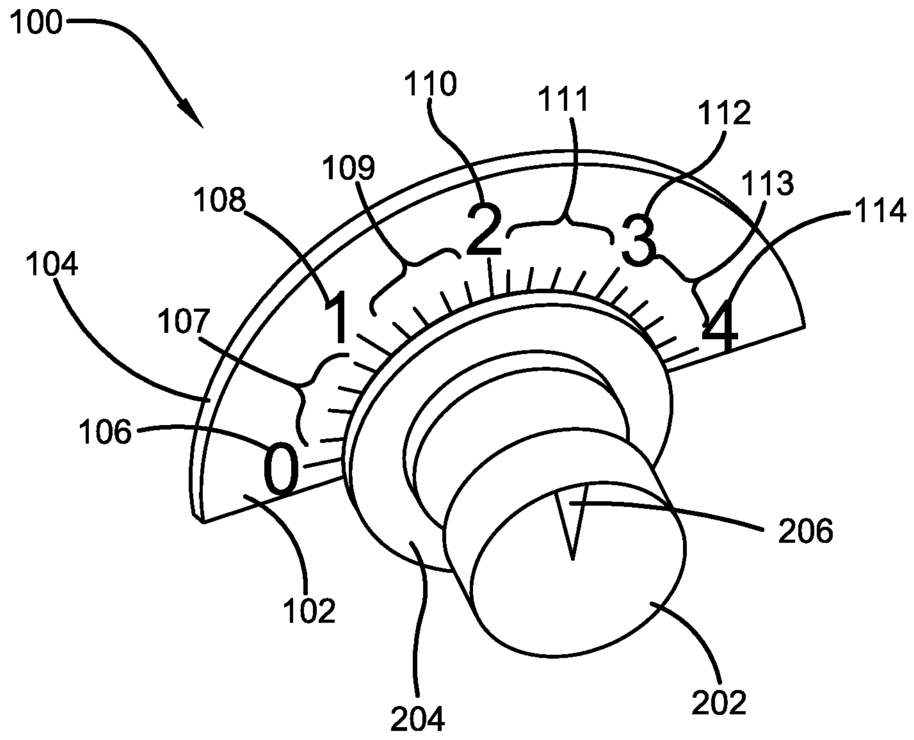
FIG. 2 illustrates a perspective view of the faucet water temperature guide device of FIG. 1 in use with a faucet or shower handle in accordance with the disclosed architecture.

FIG. 2 illustrates a perspective view of the faucet water temperature guide device of FIG. 1 in use with a faucet or shower handle in accordance with the disclosed architecture. The device 100 is adhered either permanently or temporarily around the base 204 of the faucet handle or fixture 202 using the rear surface 104 as described in FIG. 1. An arrow shaped sticker or relief indicator 206, which can also be available with the device 100, is attached to the handle 202. When the faucet handle 202 is turned in a conventional manner to achieve the faucet or shower water at the desired temperature, the position of the arrow sticker or relief indicator 206 is correlated with, for example, the number 110 (one of the numbers 106-114). The number 110 indicates the position of the handle 202 when the water at the ideal or preferred temperature for the user is dispensed. Thus, every subsequent time, the user can position the handle 202 (and the indicator 206) at the number 110 without trial and error of turning the handle 202 a plurality of times. The faucet water temperature guide device 100 in combination with the arrow sticker and relief indicator 206 provides a visual and tactile indicator for finding and maintaining the ideal or preferred water temperature. The device 100 helps users who struggle with inconsistent water temperature settings during bathing/showering. The arrow sticker and relief indicator 206 is waterproof, detachably attached to the faucet handle 202 and can be of any color. It will be apparent to a person skilled in the art that the device 100 saves time and effort in achieving and maintaining the desired temperature water without impacting the functionality of the faucet.

Figure 3:
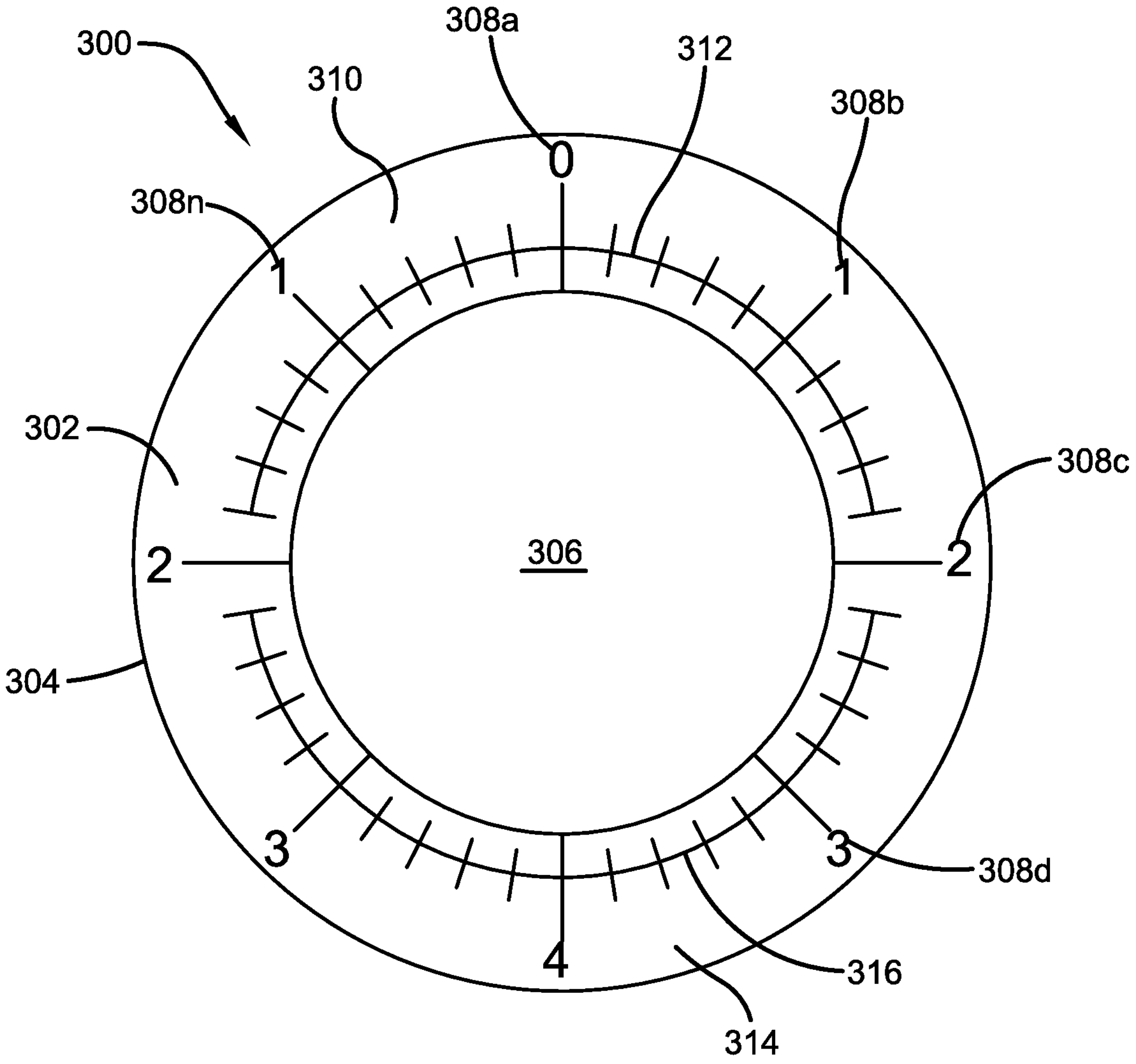
FIG. 3 illustrates a perspective view of another embodiment of the faucet water temperature guide device of the present invention in accordance with the disclosed structure.

FIG. 3 illustrates a perspective view of another embodiment of the faucet water temperature guide device of the present invention in accordance with the disclosed structure. In the present embodiment, the device 300 is in the form of a circle to wrap around a bathtub faucet and/or shower handle/fixture. More specifically, the device 300 includes a front surface 302 and an adhesive rear surface 304. A central cavity 306 is disposed in the device 300 for accommodating a handle as illustrated in FIG. 4.

The front surface 302 includes a plurality of faucet handle markers 308*a-n* for indicating a position of the faucet handle. The front surface 302 has a first portion 310 in a first color 312 and a second equal and opposing portion 314 in a second color 316, with the faucet handle markers 308*a-n* symmetrically positioned in both the portions 310, 314.

The faucet water temperature guide device 300 can come in different sizes and colors to meet requirements of different users and to adhere around faucets of different sizes. Further, the device 300 is waterproof, tamper-resistant, and can be made of a material including plastic, rubber, silicone, metal, or a combination of these materials.

Figure 4:
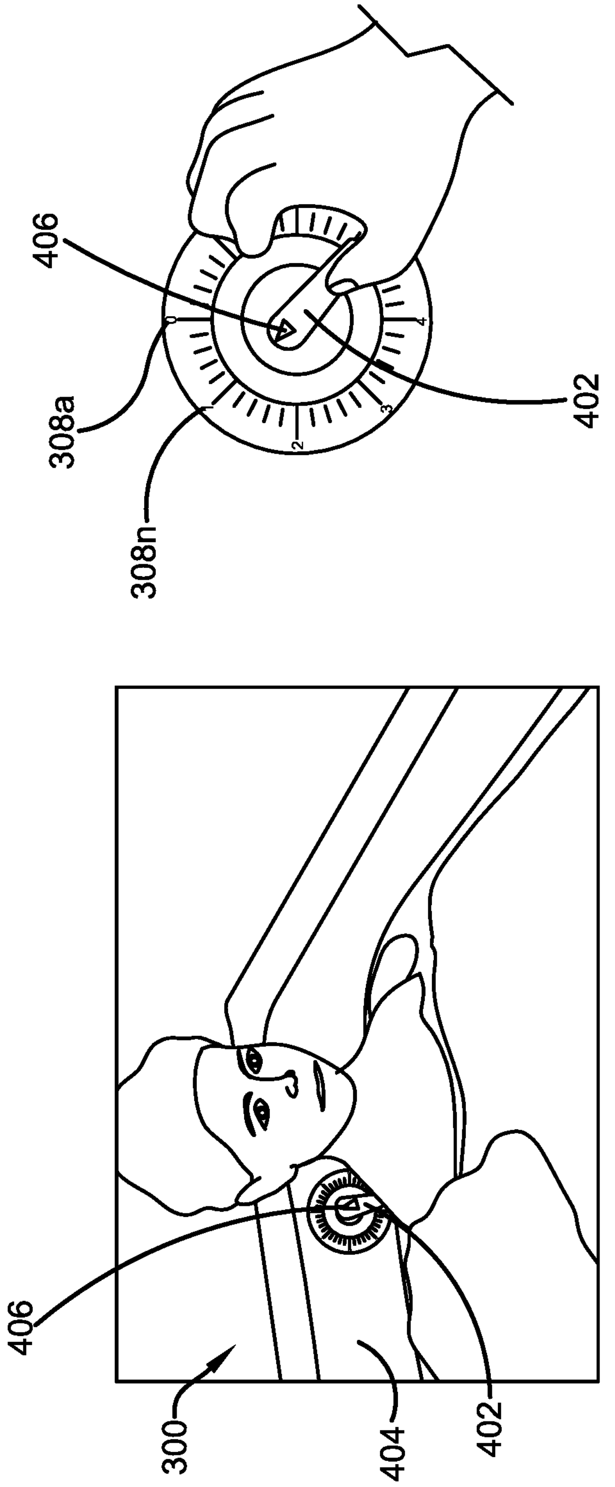
FIG. 4 illustrates the faucet water temperature guide device of FIG. 3 used in a bathtub/shower in accordance with the disclosed structure.

FIG. 4 illustrates the faucet water temperature guide device 300 of FIG. 3 used in a bathtub/shower/sink in accordance with the disclosed structure. As illustrated, the device 300 is adhered around a bathtub/shower/sink handle 402 on a bathtub/shower/sink 404. The handle 402 is positioned at an appropriate position for dispensing the ideal or preferred temperature water and then, the same position of the handle 402 is used without any trial and error during every subsequent usage of the shower handle 402 for dispensing water. Specifically, the position of the distal end 406 of the handle 402 towards one of the faucet handle markers 308*a-n* is noted and used during a bath/shower every time for quick and easy dispensing of ideal or preferred temperature water.

The devices 100, 300 can be designed for shower use, for faucets in sinks, bathtubs, and even outdoor water sources. The ring device 100, 300 can come with different designs, patterns, or even personalization features.

Figure 5:
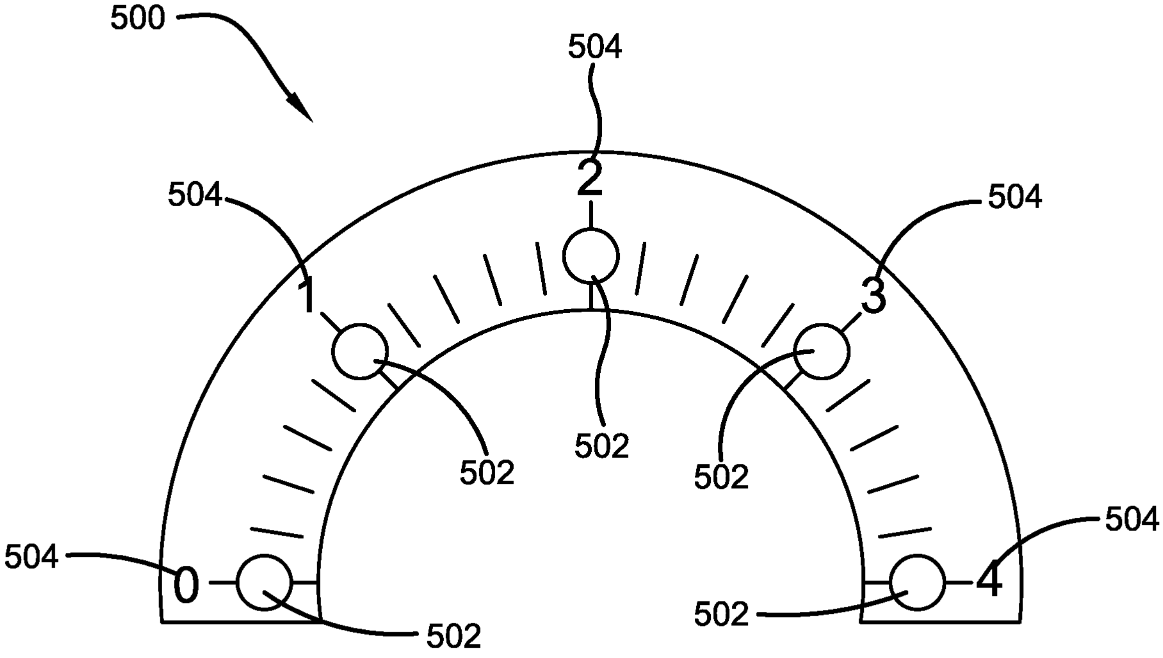
FIG. 5 illustrates yet another embodiment of the faucet water temperature guide device of the present invention in accordance with the disclosed structure.

FIG. 5 illustrates yet another embodiment of the faucet water temperature guide device of the present invention in accordance with the disclosed structure. In the present embodiment, the device 500 includes built in waterproof LEDs 502 along each faucet handle markers 504 positioned on the front surface 506 of the device 500. Each LED 502 is designed to be pushed and can be activated by pressing for at least three seconds. In use, when a handle is positioned along one of the markers 504, the corresponding LED is pressed for three seconds. During subsequent use, the LED 502 which is pressed, is automatically illuminated upon detecting a proximity object such as hand of a user. The illuminating LED provides an indication to a user about the intended position of the handle of a faucet.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "faucet water temperature guide device", "faucet water temperature indicator device", "shower dial device", and "device" are interchangeable and refer to the faucet water temperature guide device 100, 300, 500 of the present invention.

Notwithstanding the forgoing, the faucet water temperature guide device 100, 300, 500 of the present invention can be of any suitable size and configuration as is known in the art without affecting the overall concept of the invention, provided that it accomplishes the above stated objectives. One of ordinary skill in the art will appreciate that the faucet water temperature guide device 100, 300, 500 as shown in the FIGS. 1-5 are for illustrative purposes only, and that many other sizes and shapes of the faucet water temperature guide device 100, 300, 500 are well within the scope of the present disclosure. Although the dimensions of the faucet water temperature guide device 100, 300, 500 are important design parameters for user convenience, the faucet water temperature guide device 100, 300, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A faucet fixture water temperature indicator device comprising:

a water temperature indicator device having a front surface and a rear adhesive surface including at least a semi-circular shape for securing around a circular faucet fixture;

wherein said rear adhesive surface adhering to a surface surrounding the faucet fixture;

wherein said front surface having a plurality of sequential faucet position markers; and wherein said sequential faucet position markers having location indicators for positioning a handle of the faucet to a preferred position;

wherein said location indicators corresponding to temperature settings for dispensing of water from the faucet;

wherein said preferred position is a preferred temperature setting of the handle of the faucet; and a handle indicator applied to the faucet handle for aligning the faucet handle with said front surface;

wherein said location indicators and said handle indicator are LEDs; and further wherein said front surface having at least two colors including a first color coded portion and a second color coded portion.

2. The faucet fixture water temperature indicator device of claim 1, wherein said first color coded portion and said second color coded portion comprise equal portions of said front surface.

3. The faucet fixture water temperature indicator device of claim 1, wherein said location indicators are relief indicators.

4. The faucet fixture water temperature indicator device of claim 3, wherein said handle indicator is a relief indicator.

5. The faucet fixture water temperature indicator device of claim 1, wherein said water temperature indicator device having a circular shape for securing around the circular faucet fixture.

6. The faucet fixture water temperature indicator device of claim 1, wherein said location indicators and said handle indicator are phosphorescent.

7. The faucet fixture water temperature indicator device of claim 6, wherein said water temperature indicator device is waterproof.

8. The faucet fixture water temperature indicator device of claim 2, wherein said first color is a red color for indicating movement of a handle of the faucet fixture to dispense hot water and said second color is a blue color for indicating movement of the handle to dispense cold water.

* * * * *